No. 787,472. PATENTED APR. 18, 1905.
H. SCHUSTER & F. METZE.
TRANSPORTING DEVICE.
APPLICATION FILED APR. 2, 1904.

2 SHEETS—SHEET 1.

Witnesses:

Inventors:
Hermann Schuster
Friedrich Metze

No. 787,472. PATENTED APR. 18, 1905.
H. SCHUSTER & F. METZE.
TRANSPORTING DEVICE.
APPLICATION FILED APR. 2, 1904.

2 SHEETS—SHEET 2.

Witnesses: Inventors:

No. 787,472.                                              Patented April 18, 1905.

UNITED STATES PATENT OFFICE.

HERMANN SCHUSTER AND FRIEDRICH METZE, OF HALLE-ON-THE-SAALE, GERMANY.

TRANSPORTING DEVICE.

SPECIFICATION forming part of Letters Patent No. 787,472, dated April 18, 1905.

Application filed April 2, 1904. Serial No. 201,263.

*To all whom it may concern:*

Be it known that we, HERMANN SCHUSTER and FRIEDRICH METZE, subjects of the German Emperor, and residents of Halle-on-the-Saale, Germany, have invented certain new and useful Improvements in Transporting Devices, of which the following is a specification.

Figure 1:
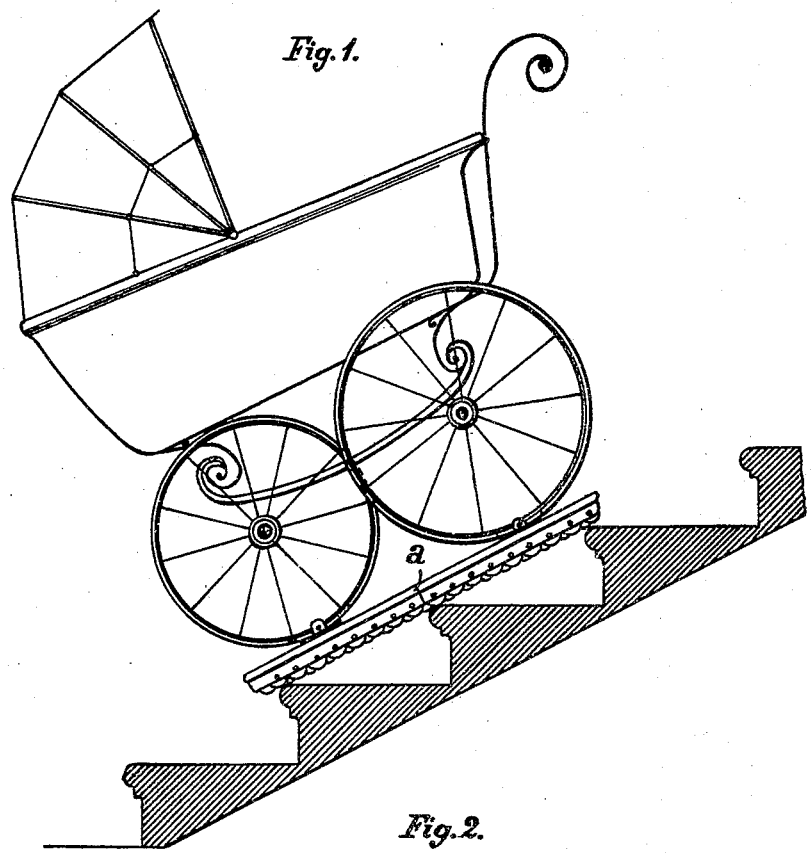
Figure 2:
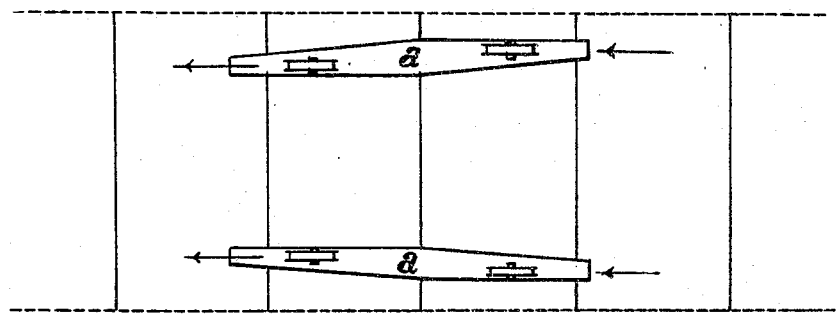
Figure 3:
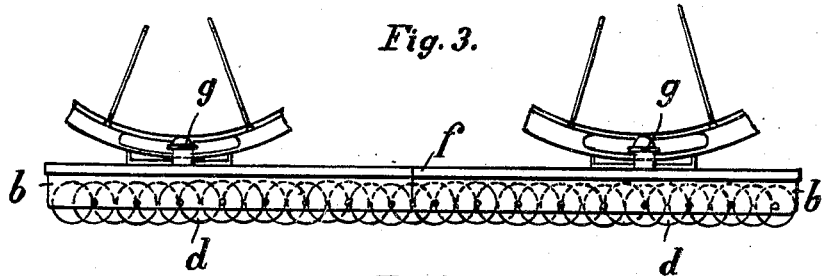
Figure 4:
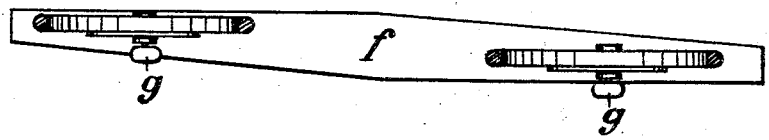
Figure 5:
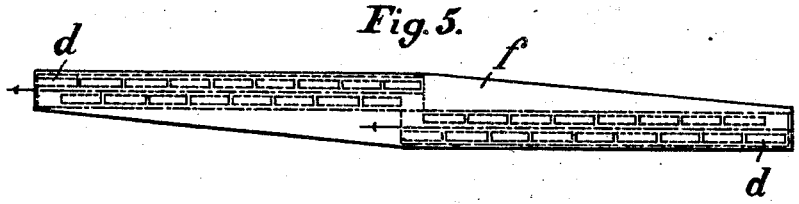
Figure 6:
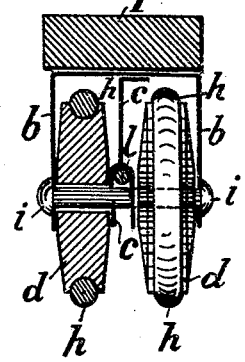
Figures 7, 8:
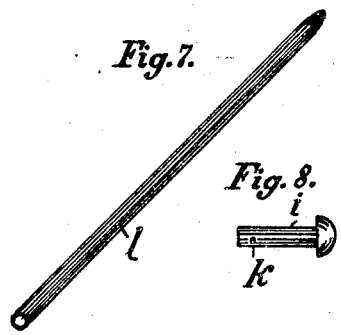

Figure 1 represents a side view, and Fig. 2 a top view, of the device. Fig. 3 represents a side view, and Fig. 4 a top view, of the device with wheels of a vehicle. Fig. 5 represents the top view on the bridge $f$. Fig. 6 shows a cross-section through the bridge $f$. Figs. 7 and 8 are side views of a rod $l$ and the axle $i$.

The subject of the present invention is a transporting device consisting of two rolling bridges $a$, fastened lengthwise (see Figs. 1 and 2) and in a simple manner underneath the wheels of the vehicle which is to go up and down stairs. The bridge is made of a wooden cover or top piece $f$, Fig. 6, underneath which there are fastened two U-shaped pieces of metal $b$ of the same length, united in the middle by a cross-piece. In the side walls of the parts $b$ and the cross-piece $c$ there are arranged as many holes as there are wheels to be put in, which wheels $d$ are not placed opposite to each other, but alternately, in order that the space between the crowns of two wheels may be filled by the opposite wheel, as may be seen from Fig. 3.

In order that all the wheels run parallelly, the parts $b$ are formed of two halves, of which one is placed on the right, the other on the left against the cover $f$, Fig. 5, to which both are fastened. Also the fastening devices $g$ for the wheels of the vehicle on the cover $f$, Figs. 3 and 4, are placed alternately.

As can be seen from Figs. 1 and 3, the wheels $d$ are only visible at their circumferences or lower parts, but otherwise covered on all sides, so that the clothes cannot get entangled in them.

The wheels $d$, Fig. 6, are provided with india-rubber tires $h$ for the sake of a noiseless running of the same.

The wheels turn on the axles $i$ in the parts $b$, which axles carry on the outsides of the parts $b$ a hemispherical rivet-head, but are at the other end only just of the thickness to go into the holes. The axles $i$ are provided with a slit $k$, Fig. 8, going about half-way through at a place that the cross-piece $c$ can enter the slit $k$, so that the cross-piece $c$ cannot get out of its position, for which purpose there is, moreover, placed a round rod $l$, as shown in Figs. 6 and 7, on top of the axles and between the walls of the cross-piece. The holes of the middle cross-piece are placed so much higher than the holes on the outside as the slit $k$ of the axles $i$ is deep, whereby the horizontal position of the latter is attained.

What we claim as our invention, and desire to secure by United States Letters Patent, is—

1. In a rolling bridge with a perambulator placed upon it for rolling the latter up and down stairs, the combination with two metal parts $b$, equal in length of cross-pieces $c$, the parts $b$ being U-shaped and fastened parallelly to each other to a common wooden top piece or cover $f$ which is tapering from the middle toward the two ends, and of little wheels $d$ arranged between the metal parts $b$, $c$, alternately and diametrically arranged fastening devices on the wooden piece $f$, substantially as set forth.

2. In a rolling bridge with a perambulator placed upon it for rolling the latter up and down stairs the combination of a bifurcated cross-piece $c$, with the fastening device of the axles in the metal parts, formed by the slit $k$ in the axles $i$, and a round metal rod $l$ substantially as and for the purpose set forth.

In testimony whereof we have signed our names to this specification in the presence of two subscribing witnesses.

HERMANN SCHUSTER.
FRIEDRICH METZE.

Witnesses:
RUDOLPH FRICKE,
P. V. C. DUNN.